United States Patent Office 3,536,645
Patented Oct. 27, 1970

3,536,645
METHOD OF REDUCING POLYPROPYLENE PARTICLE SIZE
Herron W. Miller, Morrisville, Pa., assignor to Hercules Incorporated, Wilmington, Del., a corporation of Delaware
No Drawing. Filed Mar. 29, 1968, Ser. No. 717,379
Int. Cl. C08f 45/52
U.S. Cl. 260—28.5          4 Claims

ABSTRACT OF THE DISCLOSURE

Polypropylene particles are reduced in size by forming a homogeneous solution in wax, cooling slowly to form a friable product and thereafter milling in conventional comminution apparatus. Optionally, the wax can then be removed, as by extraction and polypropylene particles recovered or the wax can be left in the particles and the blended particles used per se.

---

This invention relates to the preparation of particles of crystalline propylene polymers having particle sizes of about 75 microns or less. In an alternative embodiment, it relates to the preparation of particles of crystalline propylene polymers blended with a petroleum hydrocarbon wax.

Since the first commercial introduction of crystalline polypropylene and crystalline propylene copolymers, it has been an object of the art to develop ways to reduce the particle size of these polymers from the typical polymerization product of about 200 microns or more to a smaller, more widely useful and more readily handled size. These particles are difficult to reduce by grinding because of their great impact strength which creates considerable heat in the comminution apparatus, resulting in fusion of the particles rather than effective comminution. Other techniques, such as solution or emulsion precipitation have also been employed, but these are cumbersome and not particularly desirable economically.

It is an object of this invention to provide a method whereby crystalline propylene polymer particles of 75 microns and less can readily be prepared by grinding, wherein the difficulties related to fusion, encountered in the prior art, are substantially overcome.

The method of this invention comprises forming a substantially homogeneous solution of the crystalline propylene polymer in a hydrocarbon wax, cooling said solution slowly to room temperature to solidify the wax-polymer mixture, comminuting the solidified mass to form fine particles and thereafter extracting the wax phase. In an attractive alternative embodiment of the invention, the wax extraction step is omitted, and particles are formed comprised of wax and crystalline propylene polymer which have known utility.

The process of the invention is applicable to all types of hydrocarbon waxes and mixtures thereof. Included, for example, are paraffin wax, scale wax, microcrystalline waxes and synthetic waxes such as Fischer-Tropsch waxes. Also included are the pure long chain hydrocarbon components of these waxes such as, e.g., eicosane, docosane, pentacosane, triacontaine, and the like.

The process is operable with crystalline propylene polymers of any molecular weight. Molecular weight is usually expressed as intrinsic viscosity (I.V.). Polymers and copolymers of I.V. from about 1.5 to about 14 or higher are preferred for use in the invention. The process can be used with polymer concentrations of about 30 to 50% based on the total weight of the wax-polymer blend.

A crystalline polymer is here defined as a polymer, at least 80% of which has a steric configuration whereby it is capable of forming into a crystal lattice structure on cooling from a melt or on precipitation from a hot solution. The remainder of the material, if any, is an amorphous fraction which cannot be incorporated into crystal lattices. The presence of this amorphous polymer is not harmful in quantities up to about 20%. However, it is not necessary that any amorphous material be present.

Crystalline propylene polymers include isotactic polypropylene and crystalline copolymers containing a major portion of propylene and a minor portion of ethylene or an α-olefin of about 4 to 16 carbon atoms. Such copolymers can be of the random type having up to about 10% by weight of the second monomer or the block type having up to about 25% by weight of the second monomer. The preferred propylene polymers and the most commonly used are propylene homopolymer and random or block copolymers of propylene and ethylene.

In practicing the invention, the polymer is preferably first dispersed in molten wax and this dispersion is then melted and compounded to form a uniform solution which is cooled and treated by the comminution step. The dispersal of the polymer in wax can be effected by adding the polymer, along with any desired additives such as stabilizers, to the molten wax at a temperature below the solution temperature of the polymer in wax. This mix is agitated vigorously to disperse the polymer through the wax. Alternatively, the polymer can be prepared at a temperature below the solution temperature of the polymer using molten wax as the polymerization medium. In this way, the polymer particles are dispersed thru the wax as they are formed and agitation is not required beyond that usually employed in the polymerization process.

The wax-polymer mixture is then cooled to below the freezing or solidification point of the wax, whereby a dispersion of the large polymer particles in wax is formed. The rate of cooling at this point is not significant since the polymer is not dissolved and only the wax is being solidified. That is to say, the composition can be quenched by, e.g., transferring it from the agitated vessel to another vessel filled with water or other inert cooling liquid, or it can be simply allowed to cool in air to the required temperature. The cooled, solidified mixture is easily broken up into small pieces of ½ to 1 inch in their large dimension, of a size for feeding to an extruder or other type of compounding equipment for preparation of a uniform polymer-wax solution. This size reduction can be accomplished by any convenient means, e.g., by cutting, rolling, crushing, or other low energy means.

The particles of polymer-wax dispersion are then worked or compounded at temperatures in excess of the solution temperature to form a uniform solution. This treatment is carried out in equipment capable of subjecting the solution to high shear in order to promote the required degree of uniformity. Several types of equipment are known which are capable of performing the required work. A compounding extruder is a preferred device for accomplishing the compounding since the polymer-wax solution can then be very readily transferred to the following steps of the process. However, a grease mill, a paint mill, Banbury mixer or other compounding equipment could be used equally well.

The compounded solution is then extruded in a thin film of about 5 to 20 mils and allowed to cool slowly to room temperature. In this step, the cooling rate is important. In order for the cooled material to be brittle enough to be comminuted it must be cooled from the melt to below the wax freezing temperature at a rate less than about 80° C./min. If the cooling is accomplished too rapidly, i.e., if the solution is quenched, the wax and the polymer solidify substantially simultaneously and the solid film which results contains polypropylene in the form of a continuous phase dispersed in or around a wax phase which can be either continuous or disperse. A film of this material has tensile strength and physical integrity comparable to that of a film of the unadulterated propylene polymer. When cooling is accomplished slowly, the polymer solidifies before the wax and does not form a continuous phase. Instead it forms into large crystal spherulites of 150 to 200 microns which are substantially uniformly distributed throughout a continuous wax phase. Since the wax has very little tensile strength of its own, this composition is brittle and disintegrates readily. This film is then reduced by cutting, chopping, or similar technique to pieces of a size suitable for feeding to comminuting equipment.

The comminution of the wax-polymer film can be effected in standard comminution equipment such as, e.g., ball mills, hammer mills, and fluid energy mills.

Wax-polymer particles can be prepared by these techniques which are at least as small as one micron in diameter. Furthermore, these particles exhibit surprisingly uniform shape, being smooth surfaced and spherical. The ability to form particles of such small size and uniform shape is attributed in theory to the lubricity of the wax. This lubricity prevents heat buildup in the comminution equipment during the size reduction steps, thereby avoiding the problem of particle fusion which has been encountered by the prior art. As a result, the particles, upon being reduced to a smaller size, retain that smaller size. It also appears that sufficient heat is generated to partially melt the wax and thereby retain a continuous coating of wax around each polymer particle.

The polymer-wax particles can then be extracted with a solvent for the wax to free the small particle polymer from the wax. Any conventional solvent for hydrocarbon wax at relatively low temperatures, which is a non-solvent for the polymer, at low temperature, can be used for this purpose. Such solvents include, e.g., ether, low molecular weight alkanols, and lower boiling liquid hydrocarbons. Preferred solvents are the lower boiling liquid hydrocarbons such as, e.g., pentane, hexane, and heptane.

It has been found, surprisingly, that the polymer particles remaining after the extraction step are of substantially the same particle size distribution as were the polymer-wax particles prior to extraction. These particles, however, are quite porous and have relatively low bulk density as compared to polymer particles of the same size not treated according to the instant invention. The porosity of the polymer particles is a useful property in cases where the use to which the polymer is to be put involves dissolving the same in a solvent. It also facilitates the incorporation of additives into the polymer by the solvent deposition technique inasmuch as the porosity of the particles causes the particles to have a higher effective surface area to contact the solution of additive.

Alternatively, the wax extraction step, just discussed, can be omitted and the particles can be left in the form of a polymer-wax dispersion. In this form the particles provide an excellent method of providing wax-polymer compositions for direct use. Useful applications for such compositions have been known for some time. In particular, a blend of wax and finely divided polypropylene makes an excellent coating material for application by hot melt coating where the coating is applied by melting the wax and then heating to fuse the polymer. Such coatings can also be applied by extrusion. The wax-polymer particles of the invention are eminently suitable for this application. Coatings of this composition combine the good vapor barrier characteristics of wax coatings with the toughness, durability, and flaking resistance of polypropylene coating. These are useful in applications such as, e.g., wax paper and milk cartons. Wax-propylene polymer compositions can also be extruded to prepare self-supporting films which can be drawn to impart orientation thereto. Such films are useful, e.g., as meat wrappings, chemical barrel liners, bread wrappings, household wrapping films generally, and as carpet backings.

The following examples are intended to illustrate several embodiments of the invention, but not to limit the same. Parts and percentages are by weight unless otherwise indicated.

EXAMPLE 1

A 50/50 wax-polymer blend was prepared from conventional crystalline polypropylene flake comprised of particles from about 50 to 400 microns in size. The blend was prepared by melting a paraffin wax having a melting point of about 66° C. in a high shear mixer by means of a steam jacket. An equal quantity of stabilized polymer flake having intrinsic viscosity of 5 was then added.

The above mass was milled in the high shear mixer for about three minutes. It was then dumped from the mill into a shallow, plastic film lined pan and allowed to cool until the wax had solidified and the mass had reached a handleable temperature. This mass, a non-uniform dispersion of polypropylene in wax, was broken into pieces of 1–3 inches in size and fed to a single screw compounding extruder wherein it was worked at about 205° C. for about 2 minutes. The compounded solution was then extruded thru a strand die into a cooling bath and pelletized for ease of handling.

The wax-polymer pellets were fed to an extruder at about 200° C. and extruded thru a 10 mil film die. The extrudate was allowed to cool to room temperature at about 50° C./minute without any artificial cooling being applied so that the polypropylene phase solidified prior to the wax phase.

The brittle film resulting from the extrusion step was broken into small pieces, i.e., about 1 inch in size and was fed to a fluid energy mill. In this mill, the coarse particles were injected into a stream of nitrogen gas circulating continuously at a high velocity around a continuous, essentially circular conduit. The particles are reduced in size by impingement on each other and on the walls of the circular conduit. A portion of the circulating nitrogen was continuously removed at the interior of the loop, while makeup nitrogen is added at the same rate. The nitrogen removed at the interior of the loop carries fine particles off with it, while larger, heavier particles are kept in circulation by centrifugal force. The particle size of the material recovered from the mill was predominantly within the range of about 4 to $75\mu$ with only a negligible fraction greater than about $95\mu$ as determined by the electronic resistance technique.

A portion of the above particles was extracted 3 times with hexane to remove substantially all of the wax, then dried under vacuum of about 20″ Hg to remove residual hexane. The particle size of the extracted material was about the same as that prior to extraction.

A portion of the particles containing wax was extruded at 205° C. onto water-chilled roll (surface temperature about 30° C.) to form a film of about 1.12 mils thickness. The tensile properties of this film were as follows:

Tensile strength: 6560 p.s.i.
Elongation at break: 745%
1% secant modulus: 103,500 p.s.i.
Sonic modulus: 280,000 p.s.i.
Dart drop impact strength: 20° C.: 1.73 ft. lbs./mil; 0° C.: 0.23 ft. lbs./mil

EXAMPLE 2

Using crystalline polypropylene flask of about 50 to $300\mu$ particles size and intrinsic viscosity of about 5, a 50/50 mixture with a fully refined paraffin wax having a melting range of about 68 to 70° C. and about 0.3% oil content was prepared. The procedure for blending the wax, polymer, and stabilizer was substantially the same as in Example 1. The mass was compounded, then extruded thru a film die and slowly cooled to form a friable, brittle composition. This was treated by the fluid energy mill to form particles of predominantly 15 to $75\mu$ size range. These were washed three times with hexane, then with methyl alcohol and dried. The extracted particle size was about the same as before extraction.

A portion of the wax-polymer particles was applied as a coating to kraft paper by extrusion at about 200° C. The resultant coating adhered well enough that the paper tore upon attempting to strip the coating therefrom.

EXAMPLE 3

A polypropylene-wax composition was prepared containing equal parts of polymer and wax as in Example 2 and also containing 0.10% sodium benzoate nucleating agent. Upon being ground in the fluid energy mill, particles predominantly of about 15 to 75μ particle size were recovered.

The nucleated composition was extruded into a wax-polymer film about 1.4 mils in thickness. The tensile properties of this film were as follows:

Dart drop impact strength: 20° C.: 1.8 ft. lbs./mil; 0° C.: 1.25 ft. lbs./mil
Tensile strength: 5420 p.s.i.
Elongation at break: 575%
Sonic modulus: 320,000 p.s.i.
1% secant modulus: 126,000 p.s.i.

EXAMPLE 4

A wax-polypropylene mixture was prepared by melting 70 parts of highly refined paraffin wax of melting at about 68 to 70° C. in the high shear mixer and adding 30 parts of crystalline polypropylene flake having IV of 8 and a particle size of about 200μ thereto.

This composition was compounded and extruded to form a brittle film as described above. The brittle film was broken into 1 inch pieces and comminuted in a hammer mill to form particles having a size range of about 3 to 50μ.

The wax-polypropylene particles prepared according to the instant invention can be used in the form in which they are prepared in the formation of films, etc., as explained hereinabove. In cases where it is desired to employ compositions containing concentrations of polypropylene lower than 30%, the wax-polymer particles can be dispersed in further portions of wax to form uniform, less concentrated dispersions. This dispersal in wax can be effected readily by simple stirring. This is a highly desirable technique, inasmuch as the preparation of particles having less than 30% polymer by the method of this invention is troublesome due to the lubricity of the wax which makes extrusion and compounding difficult.

What I claim and desire to protect by Letters Patent is:

1. A process for preparing particles comprised of hydrocarbon wax and a crystalline propylene polymer and having a particle size of less than about 75μ which comprises forming a substantially uniform solution of the polymer in the wax, cooling said solution at a rate less than about 80° C./minute to a temperature below the freezing point of the wax to form a dispersion of propylene polymer particles in wax and thereafter comminuting the resultant dispersion.

2. The process of claim 1 where the propylene polymer is selected from the class consisting of isotactic polypropylene and crystalline copolymers of propylene with a minor amount of ethylene.

3. The process of claim 1 where the propylene polymer is propylene homopolymer and the hypdrocarbon wax is paraffin wax.

4. The process of claim 2 which includes the additional step of extracting the wax and recovering the propylene polymer in the form of particles of less than about 75μ.

References Cited

UNITED STATES PATENTS

| | | |
|---|---|---|
| 3,105,823 | 10/1963 | Boenau. |
| 3,175,986 | 3/1965 | Apikos. |
| 3,322,708 | 5/1967 | Wilson. |
| 3,385,720 | 5/1968 | Arabian. |

MORRIS LIEBERMAN, Primary Examiner

P. R. MICHL, Assistant Examiner

U.S. Cl. X.R.

260—93.7